W. A. DAGGETT.
Improvement in Bake-Pans.
No. 131,745.
Patented Oct. 1, 1872.
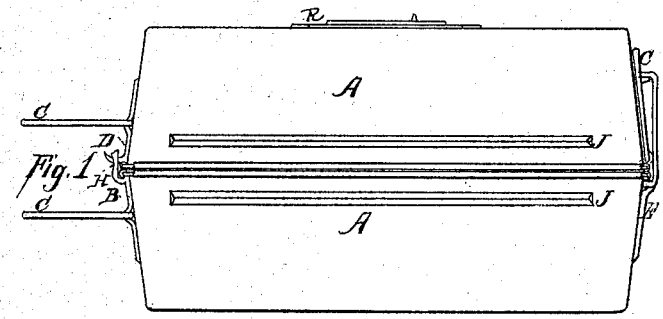
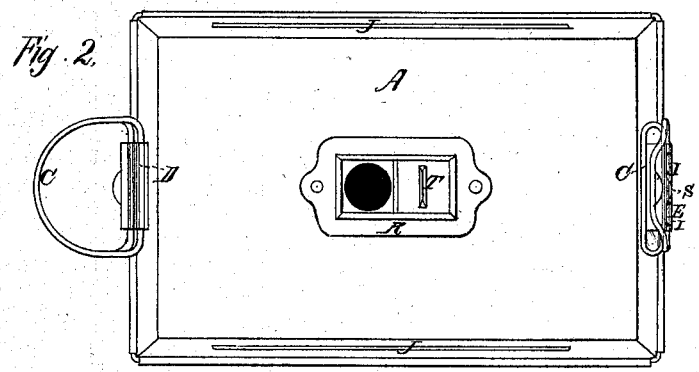
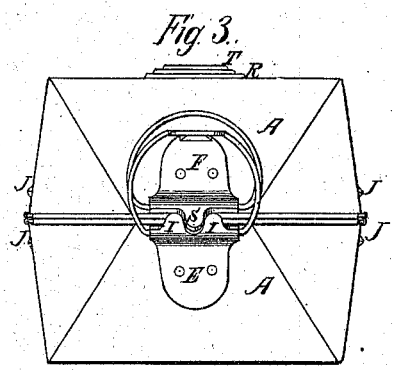 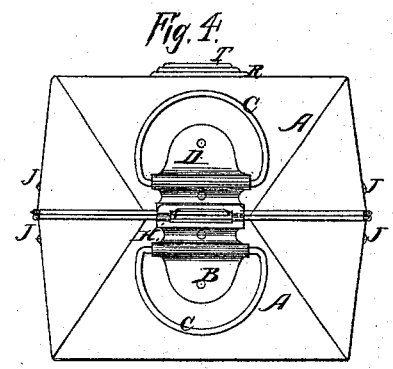
Witnesses.
Inventor.

UNITED STATES PATENT OFFICE.

WILLIAM A. DAGGETT, OF SOUTH VINELAND, NEW JERSEY.

IMPROVEMENT IN BAKE-PANS.

Specification forming part of Letters Patent No. 131,745, dated October 1, 1872.

*To all whom it may concern:*

Be it known that I, WILLIAM A. DAGGETT, of South Vineland, State of New Jersey, have invented certain Improvements in Bread-Pans, of which the following is a specification:

My invention relates to certain improvements in the construction of pans for baking bread, and in the means for uniting and fastening them together.

Description of the Drawing.

Figure 1 is a side view; Fig. 2, a top view; Fig. 3, a view of one end; Fig. 4, a view of the other end.

To explain more particularly the device and invention in its construction and operation, first, I construct two pans, A A, of any suitable material. I then run a gage-line, J, along the sides of each pan at a suitable distance from the top or bottom. I then make a metal plate for each end of each pan, and each plate has a groove across the under side to receive a wire handle, C. On the under pan at one end one of these plates B is secured by means of rivets. This plate projects above the wiring about one-fourth of an inch, and is provided with a hole, H, above the wiring of the pan. The upper pan is also provided at one end with a plate, D, but does not project from the wiring like the one on the under pan, but comes about even with the wiring, and has a lip projecting at the lower end so that when the pans are placed together the lip slips into the hole through the plate on the under pan. In this way the pans are fastened together at one end, and provided with handles. At the other end the pans are provided with plates and wire handles, which are secured to the pans by rivets, the same as the first ones, but the forms of the plates are different. The plate E on the under pan is formed with two tongues, I I, projecting upward above the wiring about one-eighth of an inch. The plate F on the upper pan is provided with one tongue, S, that projects downward and fits between the tongues I I of the plate on the lower pan. The projecting of the tongues overlaps the wiring of each pan, thus preventing the pans from slipping endwise, and the tongues, fitting like cogs, prevent the pans from slipping sidewise. In order to fasten this end of the pans together the handle in the lower plate is turned up over a projecting lip or catch on the upper end of the plate F on the upper pan. The fastenings on this end of the pans are described in Letters Patent issued to me December 6th, 1870. A further improvement is a register, R, for the purpose of ventilating and also retaining the nutritious gases in the bread while baking. It consists of an oblong metal frame placed on the top of the upper pan. The center is an open space, square at the ends and straight sided. The open space is about twice as long as it is wide, and beveled from the top down and outward, making the space largest on the under side. In this space is placed a metal slide, T. On the top of this slide is a projecting piece for the convenience of moving it back and forth to open and shut the opening that is made in the top of the pan. The object of the gage-line first mentioned is to ascertain the proper amount of dough required, or the amount which the pan will hold when the dough is raised and baked; thus to secure good bread, and also to stiffen the sides of the pan. The object of the end plates is to secure the cheapest and best method of securing handles to the pans, and at the same time the best and most effectual fastenings.

The object of the register is to provide the best and most convenient arrangement for closing and opening the vent in the upper pan so as to secure, as far as possible, the benefits of principles involved in the use of these pans — namely, to secure or retain the greatest amount of nutrition in the bread possible, and at the same time the most healthy article of bread; and also meat, for which it is well adapted.

What I wish to secure by Letters Patent is—

The pans A A, provided with the gage-line, the fastenings B D E F, and the register R, all constructed and combined to operate as above described.

WILLIAM A. DAGGETT.

Witnesses:
 GEORGE PEARSON,
 R. C. SYKES.